UNITED STATES PATENT OFFICE 2,472,247

FAST-SETTING COMPOUND OF RESIN AND POWDERED METAL

Edwin J. Coleman, Chicago, Ill., assignor to Crane Packing Company, Chicago, Ill., a corporation of Illinois No Drawing. Application May 31, 1945,
Serial No. 596,976

2 Claims. (Cl. 260—19)

This invention relates to a new composition of matter which is particularly well adapted for anti-frictional uses such as bearings, sealing washers and the like, and to a method of producing such composition of matter.

It has been proposed to produce a composition of matter having low frictional resistance by combining powdered metals such as lead and antimony with a thermosetting resin and other ingredients in accordance with a certain formula described in C. P. Teeple Patent No. 2,326,000, dated August 3, 1943. The proposed formula calls for the use of 45.5% by weight of short fibrous asbestos and powered resin of the phenol-formaldehyde type, about 50% of each; 27.3% powdered lead, 9.1% powdered antimony and 18.2% natural flake graphite. A small percentage of tin may be added in place of some of the antimony so that the proportion of lead to antimony to tin is about 21 to 3 to 1. This composition when formed into a sealing ring having one surface ground and lapped, provides very good sealing characteristics combined with relatively long life and low frictional resistance.

In the process of manufacturing a sealing washer from material made according to the Teeple formula, it is necessary to place a measured quantity of the material in a mold and to subject the measured quantity while in the mold to heat and pressure for a period of approximately 3½ minutes in order to properly form and set the resin. This length of time for the formation of a relatively small washer is not very satisfactory and makes the cost of the washer undesirably high.

Accordingly, the object of this invention is to provide a new composition for an anti-friction device and a new method of forming the device which will permit of a very great reduction in the labor time required to produce such a device and hence effect a material reduction in its cost.

I have found that in order to reduce the time required to mold a washer or the like from a material having various fillers dispersed in a resin, such as the Teeple material, it is necessary to change the composition of the material by increasing the resin content of the aforementioned formula. The resin used in the above-mentioned formula comprises approximately 22% by weight of the total ingredients. It was found that the prior composition could not be processed over hot rolls because the curing reaction would be advanced too far by this operation to permit of subsequent molding and curing. The various ingredients were therefore mixed in a ball mixer or the like and then measured quantities were placed directly in a mold, or alternatively were cold-molded into "preforms" which were then placed in a mold, and upon the application of heat and pressure were molded into the desired shape. The full time of an operator was required during the molding operation, which also included the curing operation, and it averaged about 3½ minutes per washer. This time could not be decreased because the material could not take a set in a shorter time to permit the washer to be handled conveniently and transferred to a curing oven.

According to the present invention the composition is modified to enable the setting reaction to be controlled. To produce such a composition the proportion of the resin has been increased to about 35% by weight of the whole and it may be increased to as much as 50%. With this increased resin content it is possible to control the setting of the resin more easily. Thus it is possible to process the composition including the fillers of antimony, lead, tin, graphite and asbestos over hot rolls to get better dispersion of these fillers in the resin and to coat the fillers more completely with the resin without carrying the setting reaction to the end point. Ample residual or potential reactive ability remains to permit subsequent manipulation of the material under heat and pressure.

In the carrying out of this invention the material is prepared by mixing the resin with fillers of lead, antimony, tin, graphite and fibrous elements such as asbestos over hot rolls to form sheets. The sheets are then stripped off the rolls and ground into powder.

After grinding, the resultant molding powder with its residual reactive potential is ready to be formed into a machine element such as a sealing washer. This residual reactive potential is utilized to give the material a sufficient set in a very short time to permit handling. Accordingly, the molding powder is fed to a machine which is adapted to perform a complete molding cycle in approximately ½ second. The cycle includes feeding a measured quantity into a die, applying pressure to the material, removing the pressure and ejecting the finished washer. The die is heated, preferably to about 200° F. and the pressure is applied gradually, reaching a maximum of about 28,000 pounds per square inch. To avoid fluctuations in the temperature of the die, the material is preheated so that it is at a temperature of about 175° F. This preheating may be accomplished by providing a heating device in the feed shoe of the machine in which the matei al is stored prior to being fed to the die. The entire cycle, from the feeding and measuring to the ejection of the finished washer is preferably performed automatically, and the cycles likewise are preferably repeated automatically so that the operator need only keep the feed shoe filled and store the finished washers.

The washer as it leaves the machine is sufficiently rigid to permit handling but is still substantially uncured. To complete the cure, the washer is placed in an oven in which the temperature is increased at periodic intervals to about 350° F. Several thousand washers may be cured simultaneously, depending upon the capacity of the oven. The final curing cycle may be controlled automatically so that after the washers are placed in the oven the temperature is increased automatically to the desired final value and then dropped to the starting temperature. The curing time for washers made in accordance with this method is from 24 to 36 hours. This curing time and the gradual increase in temperature are desirable to avoid an excessively rapid release of gases from the material which would distort the material and render it unfit for its intended function.

The cured washer is then ground, lapped or otherwise machined to the desired shape or surface condition, after which it is ready for use.

A comparison of the cost of a washer made in accordance with the foregoing composition and technique with the cost of a similar washer made in accordance with the prior art composition and technique indicates approximately a 75% reduction.

A typical example of the formula for the improved fast-setting compound is as follows:

| | Per cent by weight |
|---|---|
| Asbestos floats | 21 to 30 |
| Metallic filler | 25 to 30 |
| Resin | 35 to 50 |
| Graphite | 14 to 20 |
| Zinc stearate | .3 to .7 |

The metallic filler should comprise approximately 84% lead, 12% antimony and 4% tin and should preferably be in the form of an alloy of these metals. A composition having, by weight, asbestos floats—22.4%, metal alloy of lead, antimony and tin—27.8%, phenolic resin—35.2%, graphite—14.1% and zinc stearate—.5%, has been found to give excellent results.

Although the action of the material in the mold has been described as a "fast" setting of the resin, it is not definitely known what causes the various ingredients of the material to adhere together in so short a time. It is known that the metal powder, since it contains a large amount of a plastic metal such as lead, has an appreciable binding characteristic and in the molding operation the metal powder may act as a binder as well as the resin under the pressures and temperatures used in the mold. It is definitely known, however, that the increase in resin content from 22% to 35% or more is an essential factor in making possible the use of a technique of forming a washer or the like in which the molding time is reduced to approximately ½ second.

It is understood that although the invention has been described with reference to an antifriction sealing washer, it is suitable for use in the formation of other machine elements including thrust bearings, bushings and liners.

It is understood further that the foregoing description is illustrative of a preferred embodiment of this invention and that the scope of the invention therefore is not to be limited thereto but is to be determined by the appended claims.

What is claimed is:

1. A composition of matter comprising an asbestos filler, powdered metal alloy having 80% to 85% by weight of lead and the remainder antimony and tin, graphite and a thermosetting potentially reactive phenol-formaldehyde resin in the following proportions by weight:

| | Per cent |
|---|---|
| Phenolic resin | 35–50 |
| Asbestos filler | 22–30 |
| Graphite | 13–15 | and the remainder powdered metal alloy and a lubricant.

2. A molding compound comprising by weight 22.4% asbestos floats, 27.8% metal alloy containing approximately 12% antimony, 4% tin and 84% lead; 35.2% phenol-formaldehyde resin, 14.1% graphite and 0.5% zinc stearate.

EDWIN J. COLEMAN.

REFERENCES CITED

The following references are of record in the file of this patent:

UNITED STATES PATENTS

| Number | Name | Date |
|---|---|---|
| 1,983,184 | Noftzger | Dec. 4, 1934 |
| 2,133,245 | Brice | Oct. 11, 1938 |
| 2,159,935 | Sanders | May 23, 1939 |
| 2,326,000 | Teeple | Aug. 3, 1943 |